Patented Mar. 14, 1933

1,901,109

UNITED STATES PATENT OFFICE

WERNER MAIER, OF BADEN-BADEN, GERMANY, ASSIGNOR TO AMERICAN LURGI CORPORATION, OF NEW YORK, N. Y., A CORPORATION OF NEW YORK

PROCESS FOR THE PRODUCTION OF STARCH

No Drawing. Application filed January 22, 1932, Serial No. 588,197, and in Germany January 13, 1928.

The present invention relates to a process for the production of paste or size, from starch, and for spray drying the product at the same time, this operation taking only a few fractions of a second. The method adopted consists in spraying a suspension of starch in known manner, and gelatinizing, or hydrolyzing and drying the starch in the spray.

It is known that dried and pulverized starch paste or size has the property of again forming a stiff paste, or a viscous or smooth size—according to the nature of the starch—when mixed with cold water.

The spray drying process is practically instantaneous, and evaporation is effected at very low temperature (30–40° C.) without any injury or alteration, irrespective of the temperature of the drying medium. It has been found possible to compel the starch contained in the atomized particles to undergo certain definite, predetermined changes, whilst retaining the instantaneous character of this method of drying. This is effected by exposing the atomized starch to a chemical or thermal action, or a combination of the two, which sets up an alteration of the starch, by gelatinization or hydrolysis, during the drying process. The instantaneous character of the operation prevents any excess of chemical or thermal treatment which could degrade, instead of transforming, the starch.

The chemical action of gelatinizing or hydrolyzing the starch is effected by suitable known organic or inorganic, solid or volatile agents, or by additions of the same kind to the starch or the gaseous suspensory or drying medium.

Example I

A mixture of 100 kg. of starch and 100 kg. of water is atomized in hydrochloric acid vapour heated at 200° C. Hydrolysis and desiccation of the starch ensues. The resulting product is a dry, pulverized starch size which gelatinizes in cold water.

The thermal gelatinization or hydrolysis of the starch is effected by retarding the evaporation of the liquid in which the starch is suspended, by arranging that the evaporation of the liquid does not begin until the desired and accurately predetermined transformation has occurred. The retardation is produced by suitable known agencies, such as salts, oils, pressure and the like.

Example II

A mixture of 100 kg. of wheat starch and 100 kg. of water is atomized into air heated at 300° C., the water vapour of which has a vapour pressure of 0.30 kg. per sq. cm. abs., corresponding to the boiling pressure of a water temperature of 68.7° C. That is to say, the water, or atomized particles, must attain a temperature of 68.7° C. before the evaporation of the water—i. e. drying—begins. In this manner, however, the gelatinization of the wheat starch—which occurs at 65.0–67.5° C.—is effected. The resulting product is a dry, pulverized wheat starch paste which gelatinizes in cold water.

By modifying the vapour pressure of the drying medium, and consequently the thermal effect, starch can, naturally, be gelatinized or hydrolyzed in any desired manner and also by modifying the composition of the gaseous medium employed for transforming and drying the starch, or by means of suitable known additions to the starch.

It has already been proposed to atomize natural starch with water, or with water and dilute acid, in a closed apparatus which is under pressure and is charged with superheated steam. The resulting product is stated to furnish a thin paste with water (whether cold or warm water is not specified) and give a blue coloration under the iodine test. Now, the nature of the starch obtained cannot be determined by means of the iodine test, inasmuch as both natural, gelatinized and soluble starch give a blue coloration in the reaction with iodine. On the other hand, the nature of the resulting starch can be accurately determined from the prescribed conditions of the treatment. Thus, if water is to be evaporated in an apparatus, charged with water vapour and under pressure, the water must, (as is known), be heated to a definite temperature which is dependent on the pressure, and is at least 100° C.—but is higher when the pressure is above normal—before evaporation of the water occurs (e. g. in a steam boiler). This boils the starch, which operation when performed in presence of dilute acids, degrades the starch—as is known—to the condition of "soluble starch". The resulting product is therefore "soluble starch" and not "cold-water-starch". Unisolated starch, i. e. starchy products, and also soluble starch or dextrin—products which do not form paste with cold water—may, of course, also be subjected to the process of the present invention.

I claim:—

1. Process for the production of finely divided starch forming a paste with cold water which comprises atomizing an aqueous suspension of starch into a stream of heated air containing water vapor in such amount that the vaporization of water from the atomized particles occurs at a temperature above the gelatinizing temperature of the starch and below a temperature at which further alteration of the starch is effected, whereby the starch is simultaneously gelatinized and dried.

2. Process for the production of finely divided starch forming a paste with cold water which comprises atomizing an aqueous suspension of starch into a stream of heated air containing a chemical gelatinizing agent and water vapor in such amount that the vaporization of water from the atomized particles occurs at a temperature above the gelatinizing temperature of the starch and below a temperature at which further alteration of the starch is effected, whereby the starch is simultaneously gelatinized and dried.

3. Process for the production of finely divided starch forming a paste with cold water which comprises atomizing an aqueous suspension of starch containing a chemical gelatinizing agent into a stream of heated air containing water vapor in such amount that the vaporization of water from the atomized particles occurs at a temperature above the gelatinizing temperature of the starch and below a temperature at which further alteration of the starch is effected, whereby the starch is simultaneously gelatinized and dried.

4. Process for the production of finely divided starch forming a paste with cold water which comprises atomizing an aqueous suspension of starch into a stream of heated air containing water vapor in the presence of a substance effective to increase the saturation temperature of the stream of heated air with respect to the atomized particles, the amount of water vapor in said stream being such that the vaporization of water from the atomized particles occurs at a temperature above the gelatinizing temperature of the starch and below a temperature at which further alteration of the starch is effected, whereby the starch is simultaneously gelatinized and dried.

In testimony whereof, I affix my signature.

WERNER MAIER.